United States Patent [19]

Reisener et al.

[11] Patent Number: 4,928,997
[45] Date of Patent: May 29, 1990

[54] ROTATING UNION WITH CARBON GRAPHITE LABYRINTHINE SEAL

[75] Inventors: Delbert C. Reisener, Glenview; Dennis G. Pearson, Lake Zurich, both of Ill.

[73] Assignee: Deublin Company, Northbrook, Ill.

[21] Appl. No.: 322,657

[22] Filed: Mar. 13, 1989

[51] Int. Cl.⁵ .................................... F16L 39/04
[52] U.S. Cl. ........................... 285/13; 285/136; 285/190; 285/381
[58] Field of Search .............. 285/136, 190, 13, 14, 285/381

[56] References Cited

U.S. PATENT DOCUMENTS

| | | | |
|---|---|---|---|
| 1,121,202 | 12/1914 | Rembold | 285/190 X |
| 1,532,774 | 4/1925 | Page | 285/190 |
| 2,187,147 | 1/1940 | Englesson | 285/136 |
| 2,458,343 | 1/1949 | Carleton | 285/136 |
| 2,768,843 | 10/1956 | Zeilman | 285/190 X |
| 2,781,134 | 2/1957 | Weir et al. | 285/136 X |

Primary Examiner—Thomas F. Callaghan
Attorney, Agent, or Firm—Emrich & Dithmar

[57] ABSTRACT

A multiple passage rotating union includes a housing assembly having a housing with an elongated cylindrical sleeve bearing of carbon graphite located in the axial bore of the housing and heat shrunk to the inner surface of the housing bore, the sleeve bearing defining the bearing surface for the rotor assembly of the rotating union and providing sealing between the fluid passageways through the rotating union.

12 Claims, 1 Drawing Sheet

ROTATING UNION WITH CARBON GRAPHITE LABYRINTHINE SEAL

BACKGROUND OF THE INVENTION

This invention relates to rotating union type coupling devices, and more particularly to multiple labyrinthine passage rotating unions.

Rotating unions are used in applications to couple the outlet of fluid sources to rotating devices. For example, rotating unions are used extensively in the paper processing industry, in high speed drilling and boring transfer operations, high speed machine tool spindles, clutch and brake operations, etc.

Multiple passage rotating unions have been provided for use with high-speed rotating machine parts that require two separate passages of media, or for carrying the same media at different pressures. Multiple passage rotating unions generally include a dual rotor assembly including an outer rotor and an inner rotor telescopically received within the outer rotor. The two rotors define separate fluid paths through the union from inlet ports formed in the union housing to outlet ports formed in the rotor assembly through which the fluid is conducted to the work piece with which the rotating union is associated. The rotor assembly is supported within the housing by one or more bearings which may be ball bearing assemblies, Oilite type bearings or by a composite Teflon bearing. Suitable seals must be provided within the housing to prevent cross-passage leakage. Generally, two seal assemblies are required for each passageway of the rotating union. Because such seals are susceptible to wear, provision must be made, such as providing vent holes, to prevent cross-passage leakage when the seals eventually wear out. Also, additonal machining of the housing and rotor is required to define mounting shoulders for the fluid seals and the seal retainers which isolate the fluid passageways from one another within the interior of the union housing. These requirements complicate the fabrication of both the housing and the rotor.

It would be desirable to have a multiple passage rotating union which is characterized by an extended lifetime as compared to multiple passage rotating unions presently available. It would also be desirable to have a multiple passage rotating union which is of simpler construction than multiple passage rotating unions presently available.

SUMMARY OF THE INVENTION

It is an object of the present invention to provide an improved multiple passage rotating union.

Another object of the invention is to provide a multiple passage union characterized by extended lifetime as compared to multiple passage unions presently available.

Anothe object of the invention is to provide a multiple passage union which is of simpler construction than multiple passage unions presently available.

A further object of the invention is to provide a multiple passage union in which bearing and sealing functions are integrated into a composite housing structure.

These and other objects are achieved by the present invention which has provided a multiple passage rotating union including a housing having an axial bore therethrough and rotor means rotatably supported within the axial bore of the housing. The housing defines a plurality of fluid inlet ports and the rotor means defines a plurality of fluid outlet ports. The rotor means has a plurality of fluid passageways communicating the fluid outlet ports with the fluid inlet ports. An elongated generally cylindrical sleeve member is located in the axial bore of the housing, interposed between an inner surface of the housing and the other surface of the rotor means. The sleeve member, which provides a bearing surface of the rotor means, has an axial length which is less than the axial length of the bore through the housing, the sleeve member extending along the portion of the housing which includes all of the inlet ports. The sleeve member has a plurality of apertures in registry with the inlet ports whereby all of the inlet ports are communicated with the fluid passageways through said sleeve member. The sleeve member also provides a seal between the housing and the rotor means for adjacent inlet ports.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
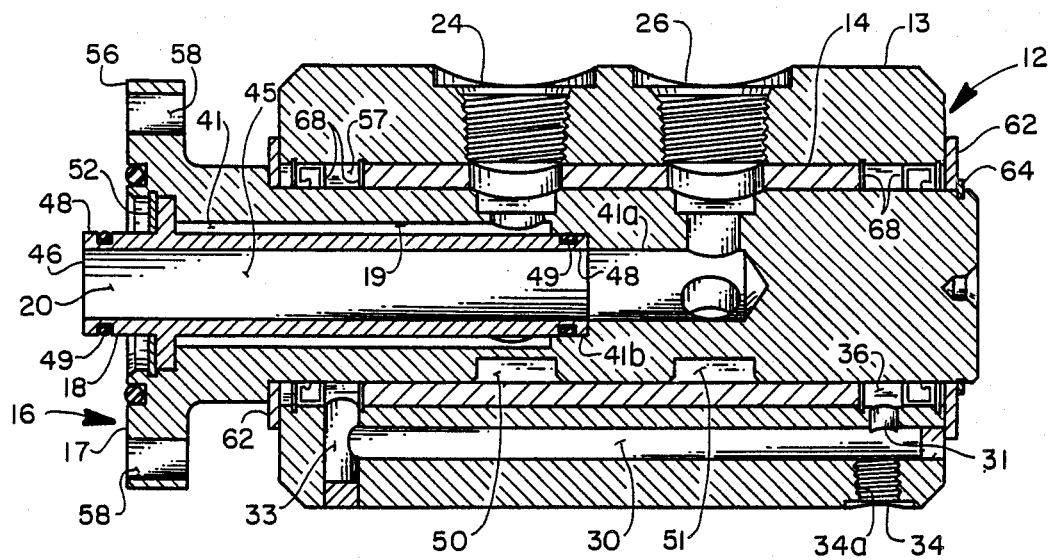
FIG. 1 is a side elevational view in section of a rotating union provided by the present invention.

Referring to FIG. 1, there is illustrated a multiple passage rotating union 10 provided by the present invention. The rotating union includes a housing assembly 12 including a housing 13 and a sleeve bearing 14, and a rotor assembly 16 including an outer rotor 17 and an inner rotor 18 rotatably supported within the housing assembly. In the exemplary embodiment, the union 10 has two labyrinthine fluid passageways therethrough including an outer passageway 19 and an inner passageway 20. The passageways 19 and 20 are defined by the housing assembly 12 and the rotor assembly 16 as will be shown.

Figure 2:
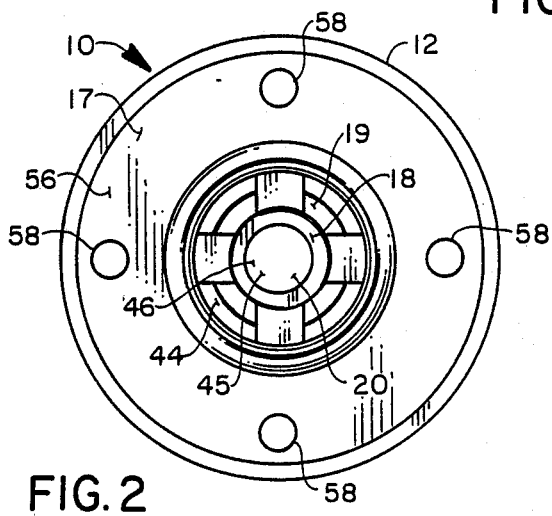
FIG. 2 is an end elevational view of the rotating union.
Figure 3:
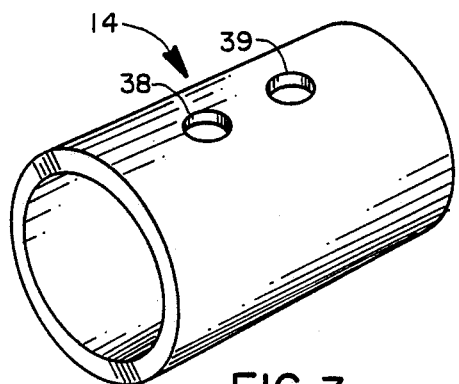
FIG. 3 is an isometric view of a sleeve bearing of the rotating union shown in FIG. 1.
Figure 4:
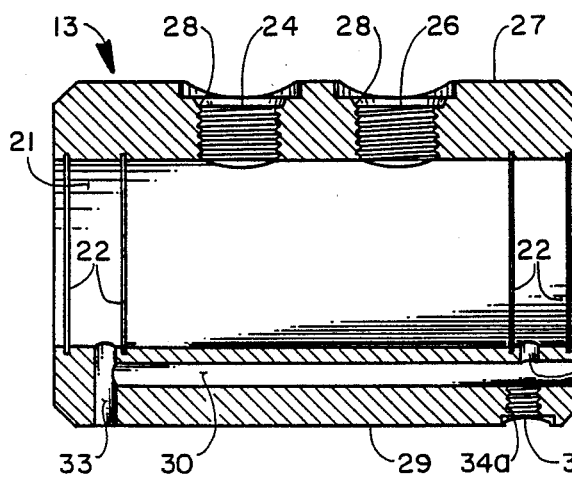
FIG. 4 is a side sectional view of the housing.
Figure 5:
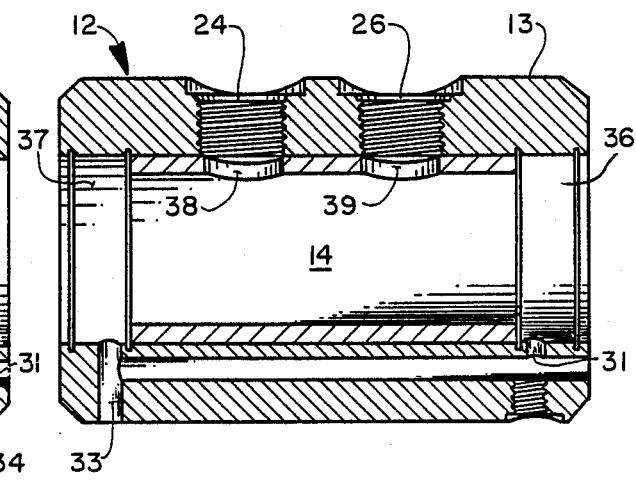
FIG. 5 is a side sectional view of the housing assembly including a housing and the sleeve bearing after machining of the assembly to provide fluid inlet ports.

Referring to FIGS. 1, 2 and 4, the housing 13 is a generally cylindrical element of machinable ferrous material such as steel. The housing has an axial bore 21 which is provided with annular grooves 22 at each end thereof. The housing 13, has two fluid inlet ports 24 and 26 formed therein and located in side-by-side relationship on the upper wall portion 27 of the housing 13 and extending radially of the housing from the outer surface towards the center axis of the housing. Each of the inlet ports 24 and 26 has a threaded inner surface 28 to facilitate connection to a source of fluid.

The lower wall portion 29 of the housing 13 defines a longitudinally extending vent passageway 30 which communicates with a radially extending internal passageway 31 through the housing wall which communicates with the interior of the housing at one end of the housing 13 and a radially extending internal passageway 33 through the housing wall which communicates with the interior of the housing at the other end. Passageway 31 defines a drain port 34 which has a threaded inner surface 34a to facilitate connection to a sump.

Referring to FIGS. 1, 2 and 4, the sleeve bearing 14 is a generally cylindrical element with a pair of apertures 38 and 39 provided therein. Preferably the sleeve bearing is formed of copper impregnated carbon graphite or similar material which is highly wear resistant and thus affords a good bearing surface. In accordance with one aspect of the present invention, the sleeve bearing 14 is force fit into the housing 13, preferably using a heat shrinking process, and both forms the internal bearing for the rotor assembly 16 and serves as a sealing element between the internal passageways 19 and 20 and the ends of the housing 13. The outer diameter of the sleeve bearing 14 is slightly greater than the inner diameter of the inner bore 21 of the housing. The axial length of the sleeve bearing 14 is less than the axial length of the housing 13 and is centered within the housing, whereby the ends of the sleeve bearing and the inner surface of the housing define annular spaces or channels 36 and 37 which communicate with radial passageways 31 and 33, respectively. The apertures 38 and 39 formed through the sleeve bearing are of a diameter similar to that of the inlet ports 24 and 26. The apertures 38 and 39 are aligned with the inlet ports 24 and 26, respectively. AS indicated, the sleeve bearing 14 is heat shrunk to the inner surface of the housing 13 to become substantially integral therewith after the heat shrinking operation.

Referring to FIGS. 1 and 2, the construction of the inner and outer rotor and the manner in which they define inner and outer passages for the rotating union is known in the art. Briefly, the outer rotor 17 of the rotor assembly 16 is a generally cylindrical element dimensioned to be received and supported within the sleeve bearing 14. The outer rotor 17 has a central bore 41 in which is received the inner rotor 18. The bore 41 has a reduced diameter portion 41a at its inner end and defines a sealing shoulder 41b. The outer diameter of the inner rotor 18 is less than the inner diameter of the bore 41 defining the outer passageway 19 through the housing. The outer passageway 19 communicates at its inlet end with inlet port 24 and terminates at its outlet end at the face of the rotor assembly 16 (FIG. 2) defining an outlet port 44.

The outer rotor 17 defines an annular groove or channel 50 in the proximity of the inlet port 24 and in communication therewith. The outer rotor 19 defines a further annular groove or channel 51 in the proximity of inlet port 26.

The inner rotor 18 has a center bore 45 therethrough defining a portion of the inner passageway 20. At one end, the bore 45 communicates with reduced diameter bore portion 41a which in turn communicates with inlet port 26. At its other end, bore 45 defines outlet port 46 for the union 10. The inner rotor 18 includes grooves 48 at each end which receive O-ring seals 49. A suitable retainer ring 52 secures the inner rotor 18 to the outer rotor 17.

The outer rotor 17 has a flanged portion 56 at its outer surface with includes four apertures 58 to facilitate attachment of the rotor to the device with which the rotating union is associated. The rotor assembly 16 is held in place in the housing assembly 12 at each end by thrust washers 62, and snap ring 64 in the manner known in the art. Retainer rings 68 which are received in the annular grooves 22 in the housing interior wall maintain the retainer assemblies in place and prevent axial movement of the sleeve bearing.

As indicated, the sleeve bearing 14 is shorter in axial length than the housing 13 defining annular spaces 36 and 37 at opposite ends between the housing 13. These annular spaces are located in the proximity of the rotor end seal assemblies at opposite ends of the rotor assembly. The annular spaces communicate the interior of the housing near these seal assemblies with the vent passageways 30, 31, and 33.

In fabricating the housing assembly 12, first the grooves 22 and passageways 31 and 33 are formed in the housing in the manner known in the art.

Then, the housing is heated in an oven to a temperature in excess of about 500° F., a temperature which is sufficient to permit expansion of the housing, thereby permitting the sleeve bearing to be inserted into the bore of the heated housing. The heated housing is removed from the oven and the sleeve bearing 14 is positioned in the bore in the housing 13 and centered therein with apertures 38 and 39 aligned with apertures which define the inlet ports 24 and 26. Then the assembly is permitted to cool. As the housing cools down, the carbon graphite sleeve bearing 14 becomes substantially integral with the housing.

After the housing assembly has cooled sufficiently, the surface of the inner bore of the sleeve bearing 14 is machined, as by honing, to provide a desired tolerance, such as 0.0005 inches, clearance between the outer rotor and the inner surface of the sleeve bearing 14 when the rotor assembly is assembled with the housing assembly.

After the housing assembly 12 has been formed, the rotor assembly 16 is positioned therein and secured in the housing assembly 12 by the snap rings 64 and thrust washers 62, as previously described.

Thus, the present invention provides a multiple passage rotating union in which a sleeve bearing 14, which supports the rotor assembly 15, is heat shrunk to the housing in an interior bore thereof. The sleeve bearing 14 is composed of a material such as carbon graphite, which both provides a good bearing surface for the rotor assembly and sealing between the fluid passageways 19 and 20 interior of the housing through which fluid flows in use. The sleeve bearing is machined to provide the necessary smooth bearing surface on which the outer surface of the rotor assembly 16 rotates in use.

We claim:

1. In a multiple passage rotating union including a housing having an axial bore therethrough and rotor means rotatably supported within the axial bore of the housing, the housing defining a plurality of fluid inlet ports, the rotor means defining a plurality of fluid outlet ports, the rotor means having a plurality of fluid passageways communicating the fluid outlet ports with the fluid inlet ports, the improvement comprising: an elongated generally cylindrical one-piece sleeve member of a hard, rigid anti-friction material, said sleeve member being assembled with said housing, located in the axial bore of the housing, interposed between an inner surface of the housing and the outer surface of the rotor means, said sleeve member providing a bearing surface for the rotor means, said sleeve member extending along the portion of the housing which includes all of the inlet ports, said sleeve member having a plurality of apertures in registry with the inlet ports whereby all of the inlet ports are communicated with the fluid passageways through said sleeve member, and the outer diameter of said sleeve member being greater than the inner diameter of the bore through the housing prior to assembly therewith, and said housing being expanded by heating to increase the inner diameter of its bore to facilitate location of said sleeve therewithin, thereby providing an interference fit between said sleeve member and the housing upon subsequent cooling of said housing with said sleeve member assembled together with the housing, said sleeve member providing a seal between the housing and the rotor means for adjacent inlet ports.

2. A rotating union according to claim 1, wherein said sleeve member is composed of carbon graphite.

3. A rotating union according to claim 2, wherein the housing is composed of ferrous material.

4. A rotating union according to claim 1 wherein said sleeve member has first and second ends and said sleeve member defines first and second annular cavities adjacent to its first and second ends, said first and second annular cavities encompassing the rotor means, the housing having a vent passageway therethrough for communicating said first and second cavities with the exterior of the housing.

5. A rotating union according to claim 1 wherein said sleeve member has first and second ends spaced inwardly of the housing at each end of the housing, and said sleeve member defines first and second annular cavities at its first and second ends, said first and second annular cavities encompassing the rotor means, the housing having a vent passageway therethrough for communicating said first and second annular cavities with the exterior of the housing.

6. In a multiple passage rotating union including a housing having an axial bore and a rotor assembly having an inner rotor and an outer rotor, the rotor assembly being rotatably supported within the axial bore of the housing, the housing defining at least first and second fluid inlet ports, the rotor assembly defining at least first and second fluid outlet ports, the rotor assembly having a first fluid passagway communicating the first outlet port with the inlet port and a second fluid passageway communicating the second outlet port with the second inlet port, the improvement comprising: an elongated generally cylindrical one-piece sleeve member of a hard, rigid anti-friction material, said sleeve member being assembled with said housing, located in the axial bore of the housing, interposed between an inner surface of the housing and the outer surface of the rotor assembly, said sleeve member providing a bearing surface for the rotor assembly, and said sleeve member extending along the portion of the housing which includes the first and second inlet ports, said sleeve member having first and second apertures in registry with the first and second inlet ports whereby the first and second inlet ports are communicated with the first and second passageways, respectively, through said sleeve member, and the outer diameter of said sleeve member being greater than the inner diameter of the bore through the housing prior to assembly therewith and said housing being expanded by heating to increase the diameter of its bore to facilitate location of said sleeve therewithin, thereby providing an interference fit between said sleeve member and the housing upon subsequent cooling of said housing with said sleeve member assembled together with the housing, said sleeve member providing a seal between the housing and the rotor assembly for the first and second inlet ports.

7. A rotating union according to claim 6, wherein said sleeve member is composed of carbon graphite.

8. A rotating union according to claim 6, wherein said sleeve member is spaced inwardly of the housing at each end of the housing, defining first and second annular cavities encompassing the outer rotor, the housing having a vent passageway formed therethrough for communicating said first and second cavities with the exterior of the housing.

9. In a multiple passage rotating union including a housing having an axial bore therethrough and a rotor means rotatably supported within the axial bore of the housing, the housing defining a plurality of fluid inlet ports, the rotor means defining a plurality of fluid outlet ports, the rotor means having a plurality of fluid passageways communicating the fluid outlet ports with the fluid inlet ports, the improvement comprising: an elongated generally cylindrical one-piece sleeve member of a hard rigid anti-friction material, said sleeve member being assembled with said housing, located in the axial bore of the housing, interposed between an inner surface of the housing and the outer surface of the rotor means providing a bearing surface for the rotor means, the outside diameter of said sleeve member being greater than the inner diameter of the bore through the housing prior to assembly therewith and said housing being expanded by heating to increase the inner diameter of its bore to facilitate location of said sleeve therewithin, thereby providing an interference fit between said sleeve member and the housing upon subsequent cooling of said housing with said sleeve member assembled together with the housing, said sleeve member having a plurality of apertures in registry with the inlet ports, whereby all of the inlet ports are communicated with the fluid passageways through said sleeve member, said sleeve member providing a seal between the housing and the rotor means for adjacent inlet ports, said sleeve member cooperating with the housing at opposite ends thereof to define first and second annular cavities encompassing the rotor means, and the housing having a vent passageway therethrough for communicating said first and second cavities with the exterior of the housing.

10. A rotating union according to claim 9 wherein said sleeve member is composed of carbon graphite.

11. A rotating union according to claim 10, wherein the housing is composed of a ferrous material.

12. A rotating union according to claim 9, wherein the rotor means includes an outer rotor and an inner rotor rotatably mounted within the outer rotor, the inner rotor having a first fluid passageway therethrough communicating a first outlet port with a first one of the inlet ports, the outer rotor having a second fluid passageway therethrough communicating a second outlet port with a second one of the inlet ports.

* * * * *